(12) United States Patent
Crucs et al.

(10) Patent No.: US 8,073,228 B2
(45) Date of Patent: Dec. 6, 2011

(54) KITS FOR REDUNDANT IMAGE ACQUISITION

(75) Inventors: Kevin M. Crucs, Akron, OH (US); Patrick James Williams, Cuyahoga Falls, OH (US)

(73) Assignee: Apteryx, Inc., Akron, OH (US)

( * ) Notice: Subject to any disclaimer, the term of this patent is extended or adjusted under 35 U.S.C. 154(b) by 1110 days.

(21) Appl. No.: 11/858,930

(22) Filed: Sep. 21, 2007

(65) Prior Publication Data

US 2009/0080720 A1 Mar. 26, 2009

(51) Int. Cl.
*G06K 9/00* (2006.01)
*A61B 6/02* (2006.01)

(52) U.S. Cl. ........ 382/132; 382/128; 378/170; 378/189; 378/191

(58) Field of Classification Search .................. 382/128, 382/132
See application file for complete search history.

(56) References Cited

U.S. PATENT DOCUMENTS

| | | | |
|---|---|---|---|
| 5,434,418 A * | 7/1995 | Schick | 250/370.11 |
| 5,513,252 A * | 4/1996 | Blaschka et al. | 378/98.8 |
| 5,995,583 A | 11/1999 | Schick et al. | |
| 6,169,781 B1 * | 1/2001 | Doebert et al. | 378/98.8 |
| 6,343,875 B1 * | 2/2002 | Eppinger et al. | 378/170 |
| 7,072,443 B2 | 7/2006 | Schick et al. | |
| 7,193,219 B2 | 3/2007 | Schick et al. | |
| 7,194,064 B2 | 3/2007 | Razzano et al. | |
| 7,210,847 B2 | 5/2007 | Hack | |
| 7,245,697 B2 | 7/2007 | Lang | |
| 7,281,847 B2 * | 10/2007 | Kokkaliaris et al. | 378/189 |
| 7,896,229 B2 * | 3/2011 | Crucs et al. | 235/375 |
| 7,972,060 B2 * | 7/2011 | Guichard et al. | 378/191 |
| 2006/0257816 A1 | 11/2006 | Klemola et al. | |
| 2010/0313274 A1 * | 12/2010 | Crucs | 726/26 |
| 2011/0188726 A1 * | 8/2011 | Nathaniel et al. | 382/132 |

FOREIGN PATENT DOCUMENTS

| | | |
|---|---|---|
| JP | 60007424 A | 1/1985 |
| JP | 62085565 A | 4/1987 |
| JP | 11052504 A | 2/1999 |
| JP | 2007034227 A | 2/2007 |

* cited by examiner

*Primary Examiner* — David A Vanore
(74) *Attorney, Agent, or Firm* — Hahn Loesser & Parks LLP

(57) ABSTRACT

A kit for capturing a first primary image and a second backup image from a single exposure. The kit may include a first imaging source and a second imaging source. The kit may further include an attachment mechanism for attaching the first imaging source to the second imaging source such that first imaging source and the second imaging source may be simultaneously exposed to capture a first primary image and a second backup image, respectively, of a same anatomy. The kit may further include a sterilization sheath to cover both the first imaging source and the second imaging source when the first imaging source and the second imaging source are attached and being used to capture images.

25 Claims, 10 Drawing Sheets

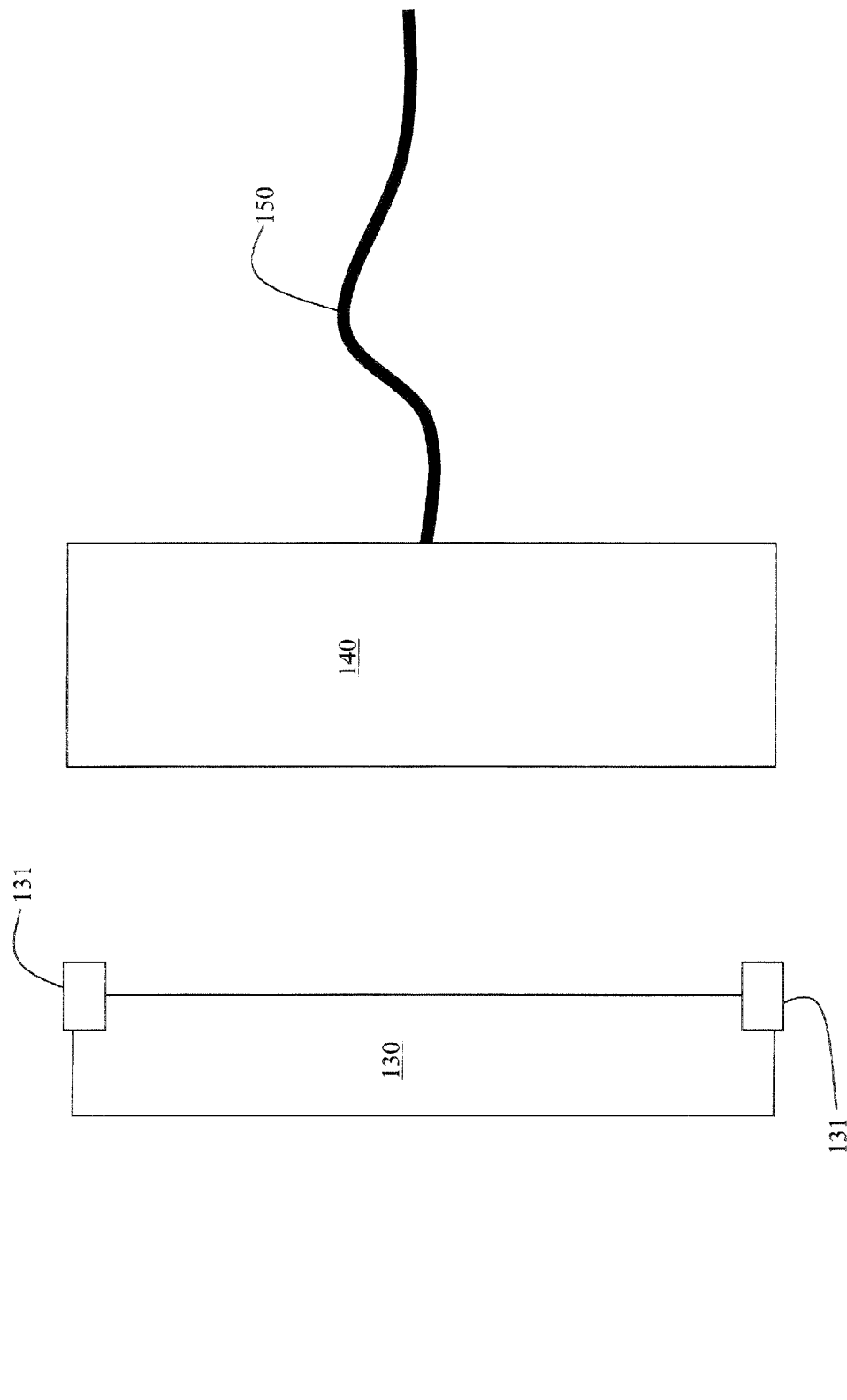

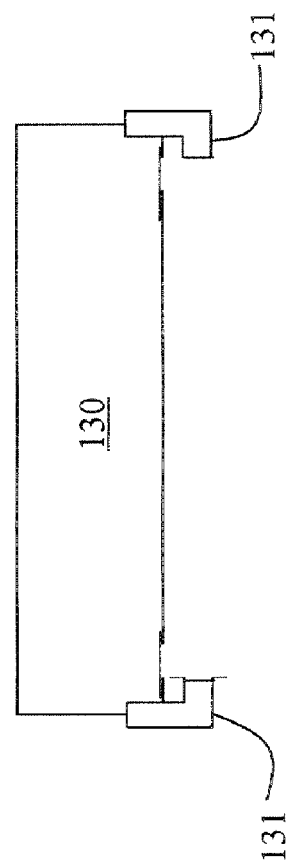
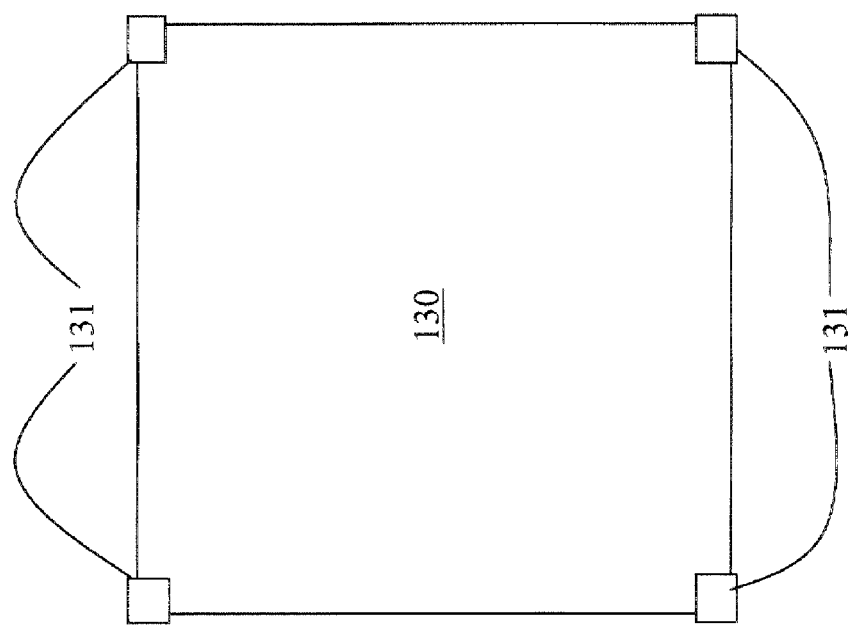

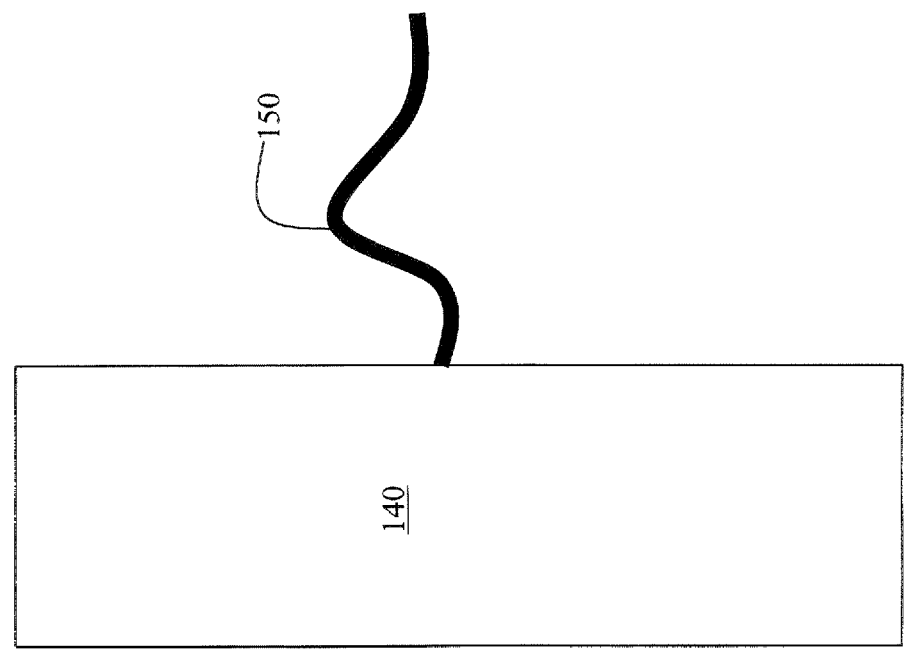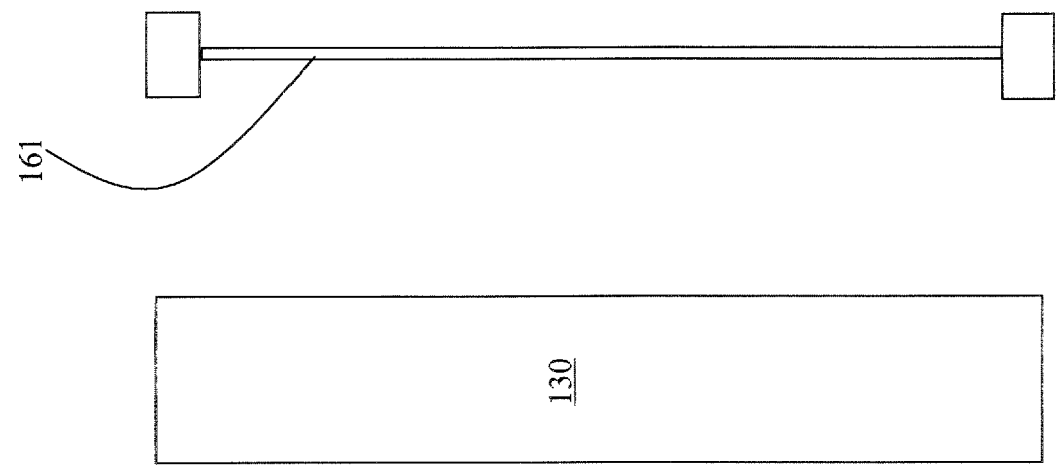
FIG. 8

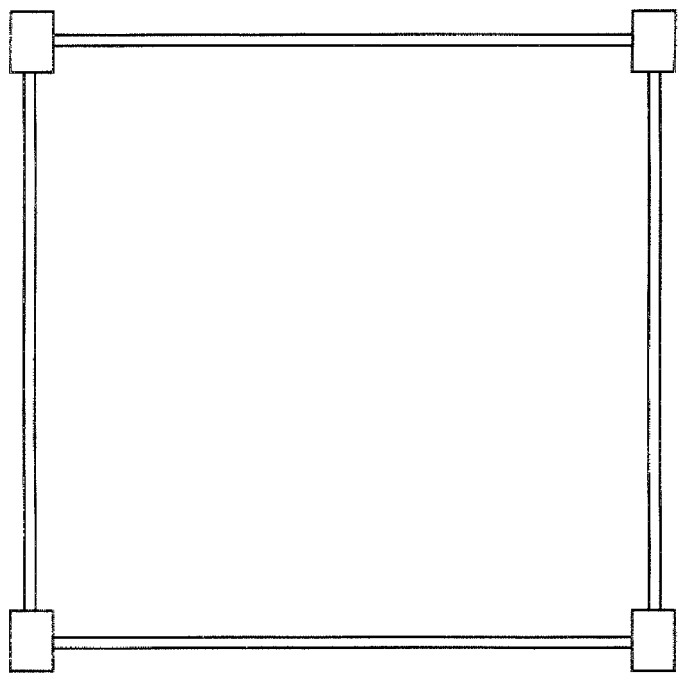
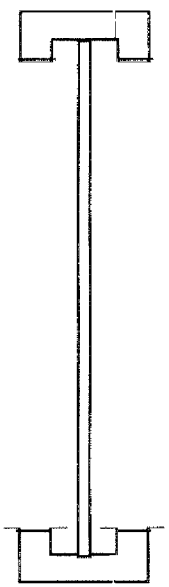
FIG. 9A
FIG. 9B
161

KITS FOR REDUNDANT IMAGE ACQUISITION

TECHNICAL FIELD

Certain embodiments relate to imaging. More particularly, certain embodiments relate to the simultaneous capture of a primary image and a backup image of a same anatomy in the context of, for example, medical imaging.

BACKGROUND

Various types of imaging systems are available for imaging the surface and/or the interior of such diverse entities such as, for example, the human anatomy, animals, man-made physical structures such as welding joints in bridges, geological formations, bodies of water, as well as many others. For example, in the field of dentistry, various types of intra-oral sensors exist which are used for capturing images of the inside of teeth and surrounding anatomy (e.g., bone structure) by exposing the anatomy and sensors to X-ray radiation. Such imaging techniques are well known using such intra-oral sensors as, for example, X-ray sensitive film, X-ray sensitive phosphor plates, or X-ray sensitive digital sensors such as a corded charge-coupled device (CCD) sensor, for example.

When capturing an image, sometimes the sensor may fail. For example, if the sensor is a film, the film may have gone bad due to age, been damaged somehow, or may have been prematurely exposed for some reason. If the sensor is a phosphor plate, the plate may have been damaged or the plate may not have been properly erased after a previous exposure. If the sensor is a corded digital CCD sensor, the system to which the sensor is connected may fault, thus failing to extract the image information from the CCD sensor. Other mechanisms of failure are possible as well with respect to properly capturing and storing an image.

Such failures or faults may result in the operator (e.g., an imaging technician or physician) having to go back and re-expose the patient in order to attempt to capture a proper image of the desired anatomy. Furthermore, if the operator does not immediately realize that a failure has occurred, an image of a particular desired anatomy may not be acquired at all during a scanning session, resulting in inadequate information being provided to the physician.

Further limitations and disadvantages of conventional, traditional, and proposed approaches will become apparent to one of skill in the art, through comparison of such systems and methods with the present invention as set forth in the remainder of the present application with reference to the drawings.

BRIEF SUMMARY

A first embodiment comprises a kit for acquiring redundant images. The kit includes means for acquiring a first primary image in response to an exposure and means for acquiring a second backup image in response to the same exposure. The kit further includes means for attaching the means for acquiring a second backup image to the means for acquiring a first primary image. The kit also includes means for keeping the means for acquiring a first primary image and the means for acquiring a second backup image sterile when the means for acquiring a second backup image and the means for acquiring a first primary image are attached via the means for attaching.

The means for attaching may be an integral part of the means for acquiring a first primary image or an integral part of the means for acquiring a second backup image. Alternatively, a first portion of the means for attaching may be an integral part of the means for acquiring a first primary image and a second portion of the means for attaching may be an integral part of the means for acquiring a second backup image. As a further alternative, the means for attaching may be separate and distinct from the means for acquiring a first primary image and the means for acquiring a second backup image.

Another embodiment comprises a kit for acquiring redundant images. The kit includes a first image capturing source and a second image capturing source capable of being attached to the first image capturing source such that the first image capturing source and the second image capturing source may be simultaneously exposed to capture a first primary image and a second backup image, respectively, of a same anatomy. The kit further includes a sterilization sheath capable of protecting the first image capturing source and the second image capturing source when the first image capturing source and the second image capturing source are attached.

The first image capturing source may comprise a digital charge-coupled-device (CCD) sensor and the second image capturing source may comprise a phosphor charge plate. Alternatively, the second image capturing source may comprise a film. As a further alternative, the first image capturing source may comprise a digital phosphor plate and the second image capturing source may comprise a film.

The kit may further include means for attaching the first image capturing source and the second image capturing source. The means for attaching may be an integral part of the first image capturing source or, alternatively, an integral part of the second image capturing source. As a further alternative, a first portion of the means for attaching may be an integral part of the first image capturing source and a second portion of the means for attaching may be an integral part of the second image capturing source. As yet another alternative, the means for attaching may be separate and distinct from the first image capturing source and the second image capturing source.

A further embodiment comprises a kit for acquiring redundant images. The kit includes a first image capturing source and a second image capturing source capable of being attached to the first image capturing source such that the first image capturing source and the second image capturing source may be simultaneously exposed to capture a first primary image and a second backup image, respectively, of a same anatomy.

Another embodiment comprises a kit for acquiring redundant images. The kit includes a first image capturing source capable of being attached to a second image capturing source such that the first image capturing source and the second image capturing source may be simultaneously exposed to capture a first primary image and a second backup image, respectively, of a same anatomy. The kit further includes a sterilization sheath capable of protecting the first image capturing source and the second image capturing source when the first image capturing source and the second image capturing source are attached.

A further embodiment comprises a kit for acquiring redundant images. The kit includes a first image capturing source. The kit further includes means for attaching the first image capturing source to a second image capturing source such that the first image capturing source and the second image capturing source may be simultaneously exposed to capture a first primary image and a second backup image, respectively, of a same anatomy. The first image capturing source may comprise a digital intra-oral sensor.

These and other advantages and novel features of the present invention, as well as details of illustrated embodiments thereof, will be more fully understood from the following description and drawings.

BRIEF DESCRIPTION OF THE DRAWINGS

FIG. 6 illustrates a schematic diagram of an exemplary embodiment of a side view of a first image capturing source being in proximity to but unattached from an exemplary embodiment of a second image capturing source having an integral attachment mechanism;

FIG. 7A illustrates a schematic diagram of a front view of the second image capturing sensor of FIG. 6 having the integral attachment mechanism, and FIG. 5B illustrates a schematic diagram of a top view of the second image capturing sensor of FIG. 6 having the integral attachment mechanism;

FIG. 8 illustrates a schematic diagram of a side view of an exemplary embodiment of a first image capturing source, a second image capturing source, and a separate and distinct attachment mechanism all in proximity to each other but not attached to each other;

FIG. 9A illustrates a schematic diagram of a front view of the attachment mechanism of FIG. 8, and FIG. 9B illustrates a schematic diagram of a top view of the attachment mechanism of FIG. 8.

DETAILED DESCRIPTION

Figure 1:
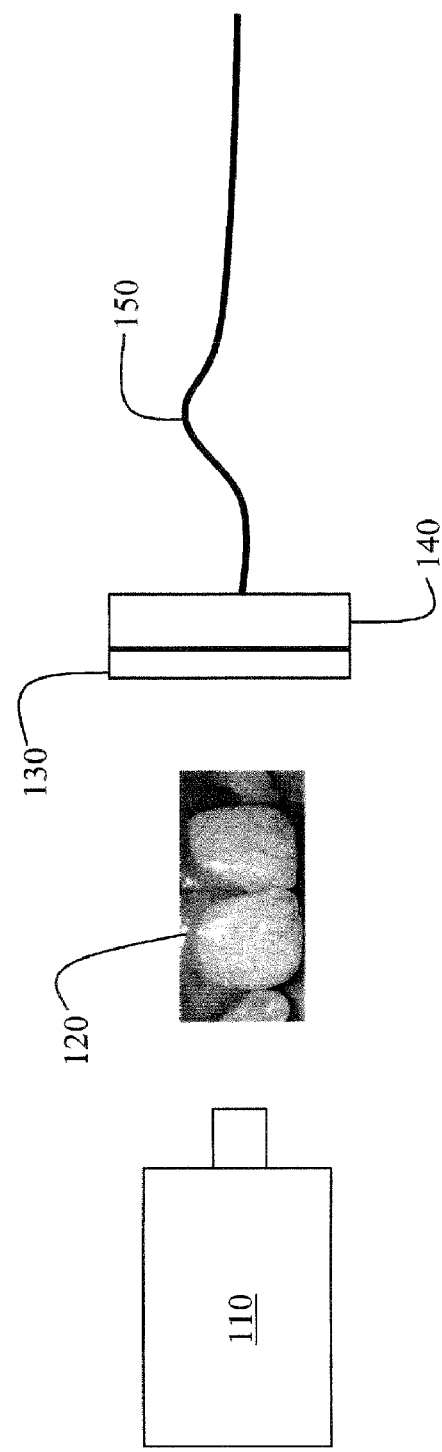
FIG. 1 illustrates a schematic diagram of an exemplary embodiment of a system for acquiring redundant images from an anatomy.

The following description is presented in the context of intra-oral imaging for the field of dentistry. However, various embodiments may be applied to other imaging fields as well such as, for example, other branches of medical imaging, geological imaging, imaging of physical man-made structures, imaging of bodies of water, etc. FIG. 1 illustrates a schematic diagram of an exemplary embodiment of a system 100 for acquiring redundant images from an anatomy 120 (e.g., teeth). The system 100 includes an X-ray source 110, a first image capturing source 140, and a second image capturing source 130. In the embodiment of FIG. 1, the first image capturing source 140 is an X-ray sensitive digital imaging sensor which is operationally attached to (e.g., overlaid onto) a cord 150 for communicating imaging data back to an image acquisition system (not shown). The second image capturing source 130 may be, for example, an X-ray sensitive film or an X-ray sensitive phosphor charge plate. Both X-ray sensitive digital imaging sensors and phosphor charge plates are well known in the art.

The first image capturing source 140 and the second image capturing source 130 are attached together such that the first image capturing source 140 and the second image capturing source 130 may be simultaneously exposed to capture a first primary image and a second backup image, respectively, of the same anatomy 120 (e.g., teeth). During use, the attached image capturing sources 130 and 140 are placed just behind the anatomy 120 of a patient to be imaged. The X-ray source 110 applies a dose of X-ray radiation to the patient which penetrates the anatomy 120. The portion of the X-ray radiation which gets through the anatomy 120 then impinges on the combination of the image capturing sources 130 and 140 allowing both sources 130 and 140 to each capture (i.e., record) an image essentially at the same time. The image capturing source 130 may actually capture an image first since it resides immediately in front of the image capturing source 140. However, for all practical purposes and for purposes of discussion herein, both images are considered to be captured simultaneously as a result of a single exposure or dose from the X-ray source 110.

In accordance with the embodiment of FIG. 1, the first image capturing source 140 is the primary imaging source and captures a first primary image. The second image capturing source 130 is the backup imaging source and captures a second backup image. For example, the first image capturing source 140 may be a digital CCD sensor which digitally captures pixels of image data upon exposure and transmits the pixels of image data back to an image acquisition system (not shown) via the electrical data cord 150 for storage and display. Such digital CCD sensors are well-known in the art. The second image capturing source 130 may be a digital phosphor plate which digitally captures pixels of image data upon exposure which may be later read by a laser scanner (not shown) in order to extract the image data.

Therefore, the phosphor plate 130 serves as a backup to the CCD sensor 140. Only if the CCD sensor 140 fails to capture an image for a given exposure, or fails to properly communicate the captured image data back to the image acquisition system, will the phosphor plate 130 be read by the laser scanner in order to acquire and store the backup image. As a result, the phosphor plate 130 attached to the front of the CCD sensor 140 serves as a backup to the CCD sensor 140, allowing the anatomy 120 to be exposed only once to an X-ray dose in order to properly acquire an image of the anatomy 120, even if the primary imaging source 140 (i.e., the CCD sensor) fails to properly capture and store an image of the anatomy 120. That is, the phosphor plate 130 captures a redundant backup image of the anatomy 120. Of course, if both image capturing sources 130 and 140 were to fail, then re-exposure will need to be performed in order to capture an image of the anatomy. However, such a dual failure situation is considered to be quite rare based on the reliability of current technology.

In an intra-oral situation where many successive shots of successive teeth are to be acquired, the dentist may take a shot of a first tooth or teeth, verify that an image was properly captured by the CCD sensor 140 (for example by viewing the captured image on a display), and then move the sensor combination 130 and 140 within the patient's mouth to immediately acquire another image of another tooth or teeth. If, on any given exposure (shot), the CCD sensor 140 fails to capture an image, the dentist may remove the sensor combination 130 and 140 from the patient's mouth and position the sensor combination 130 and 140 (still attached to each other) with respect to a laser scanner in order to read the redundant backup image data from the phosphor plate 130. In general, the sensor combination 130 and 140 is removed from the patient's mouth after every image acquisition (exposure) in order to erase the charge on phosphor plate 130 by exposing the phosphor plate 130 to an erasing light such that the phosphor plate 130 may be re-used.

The attached sensor combination 130 and 140 will typically be covered by a sterilization sheath which protects the sensors 130 and 140 from the saliva in the patient's mouth and which protects the patient from any germs (e.g., bacteria or viruses) which may exist on the sensors 130 and 140. The sterilization sheath may be transparent such that the laser scanner may read the phosphor plate 130 and the phosphor plate may be exposed to the erasing light without the sterilization sheath having to be removed from the sensor combination 130 and 140. In this way, the sensor combination 130 and 140 may be taken out of the patient's mouth, the phosphor plate 130 scanned to acquire the backup image and then erased, and the sensor combination 130 and 140 placed back in the patient's mouth for a next exposure, all in a relatively short period of time.

In accordance with other embodiments, the first image capturing source 140 may be a digital corded sensor and the second image capturing source 130 may be an X-ray sensitive film, for example. Such digital corded sensors and films are well-known in the art. If the image capturing source 130 is a film, then the sensor combination 130 and 140 is removed from the patient's mouth after every image acquisition in order to replace the exposed film with a fresh un-exposed film. In such an embodiment, the sterilization sheath is removed in order to replace the film. Then the sterilization sheath is replaced. Alternatively, the first image capturing source 140 may be an X-ray sensitive digital phosphor plate and the second image capturing source 130 may be an X-ray sensitive film, or vice versa, for example. Other sensor combinations may be possible as well, in accordance with various other embodiments. Furthermore, such sensor combinations are not limited to X-ray sensitive sensors. Other types of sensors such as photographic, ultrasonic, radiofrequency, and others are possible as well, in accordance with certain embodiments, and are well-known in the art.

Figure 2:
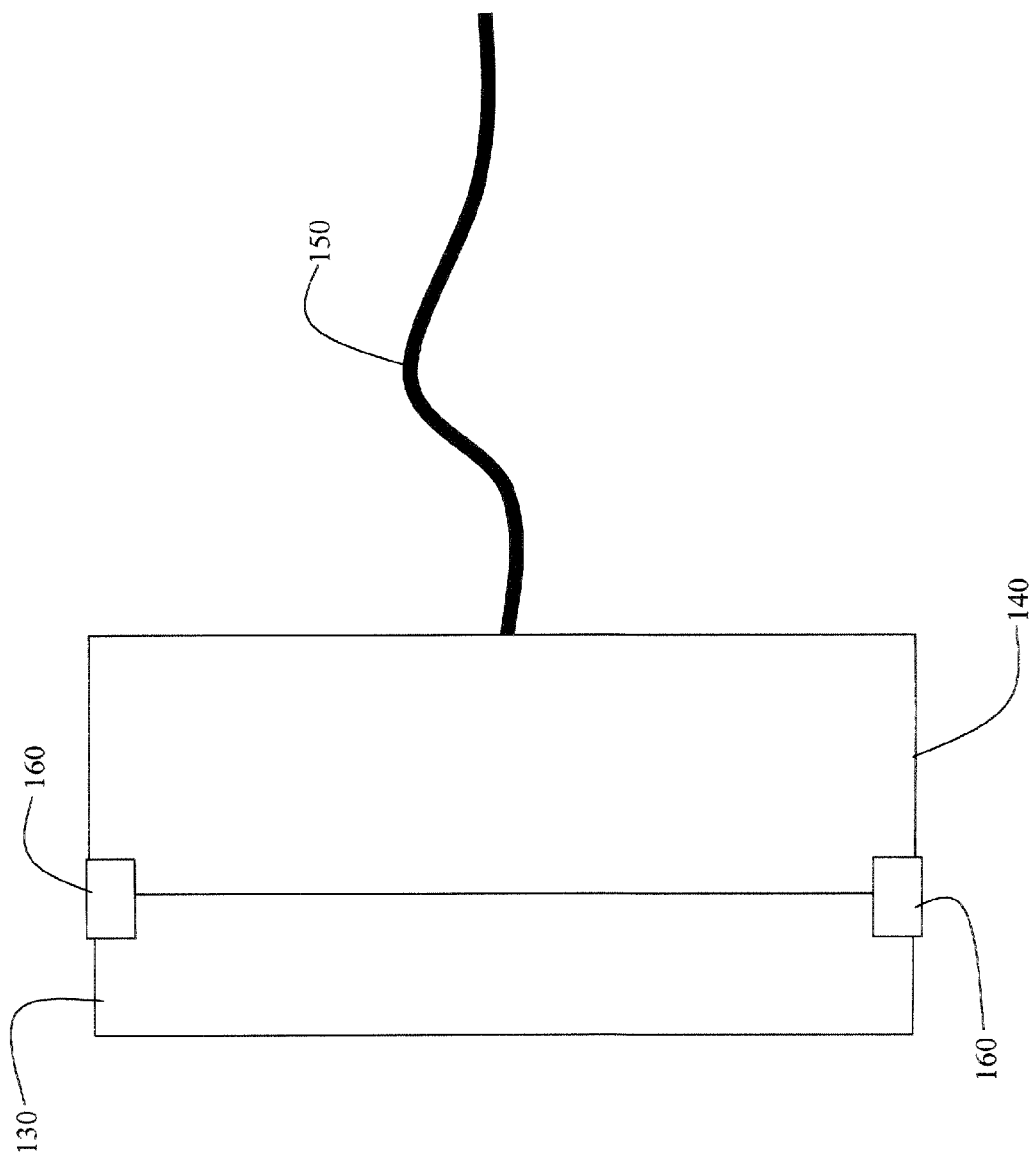
FIG. 2 illustrates a schematic diagram of an exemplary embodiment of a side view of a first image capturing source attached to a second image capturing source.

FIG. 2 illustrates a schematic diagram of an exemplary embodiment of a side view of a first image capturing source 140 attached to a second image capturing source 130. As shown in the embodiment of FIG. 2, the first image capturing source 140 is a corded sensor having a cord 150. The first image capturing source 140 and the second image capturing source 130 attach to each other via an attachment mechanism 160. For example, the front face of the first image capturing source 140 snaps on to a back face of the second image capturing source 130 via the attachment mechanism 160 such that both image capturing sources 130 and 140 may capture an image of the same anatomy 120 from a single exposure (e.g., a single X-ray dose).

Figure 3:
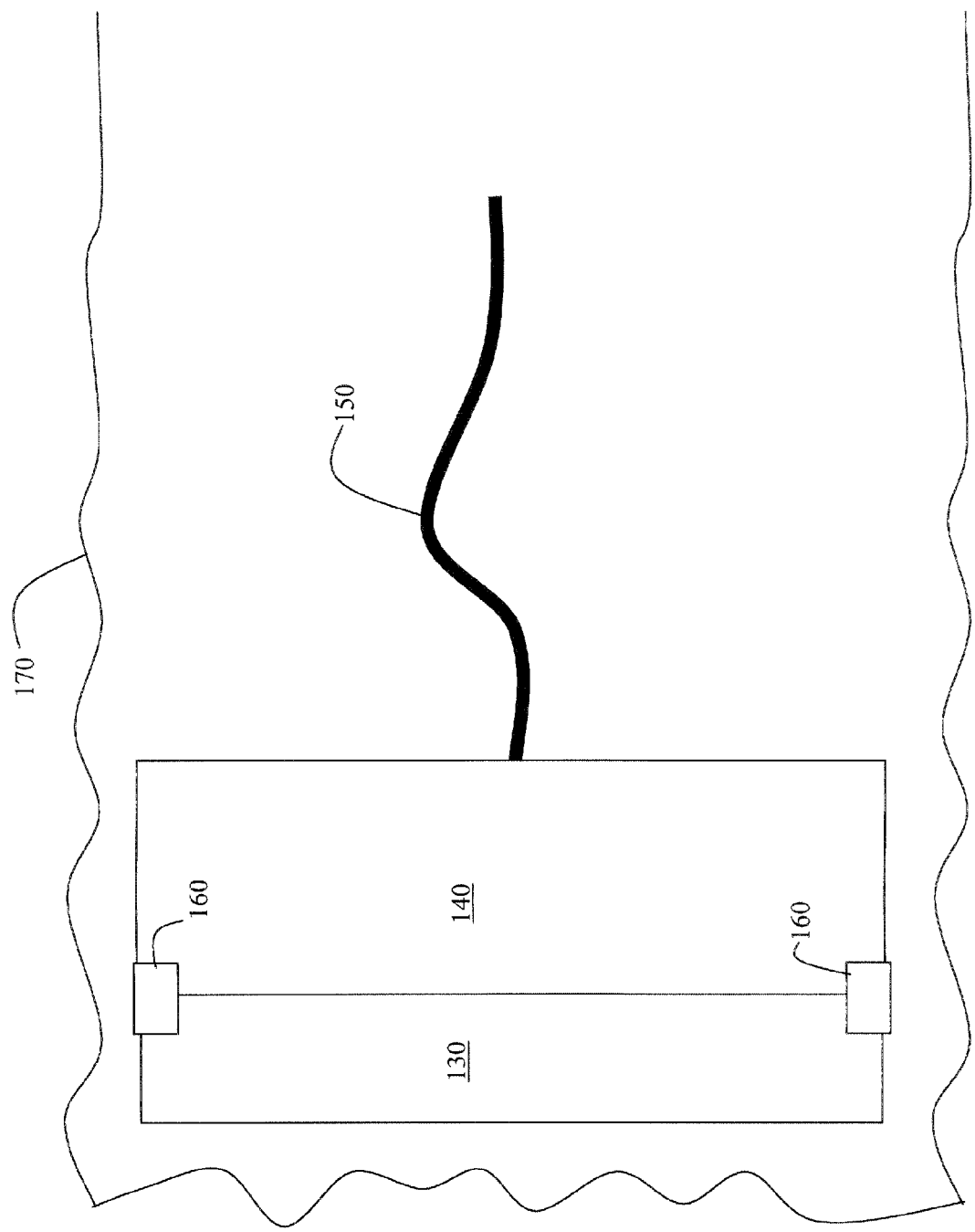
FIG. 3 illustrates a schematic diagram of the image capturing sensors of FIG. 2 being covered by an exemplary embodiment of a sterilization sheath.

In accordance with an embodiment, the length and width dimensions of the first image capturing source 140 and the second image capturing source 130 are substantially the same. However, the depth dimension of the second image capturing source 130 may be substantially less than that of the first image capturing source 140. FIG. 3 illustrates a schematic diagram of the image capturing sensors 130 and 140 of FIG. 2 being covered by an exemplary embodiment of a sterilization sheath 170. The sterilization sheath is transparent to the exposing energy (e.g., X-ray energy) and may also be transparent to a laser light of a laser scanning source and an erasing light of an erasing source if, for example, one of the image capturing sources is a phosphor plate.

Figure 4:
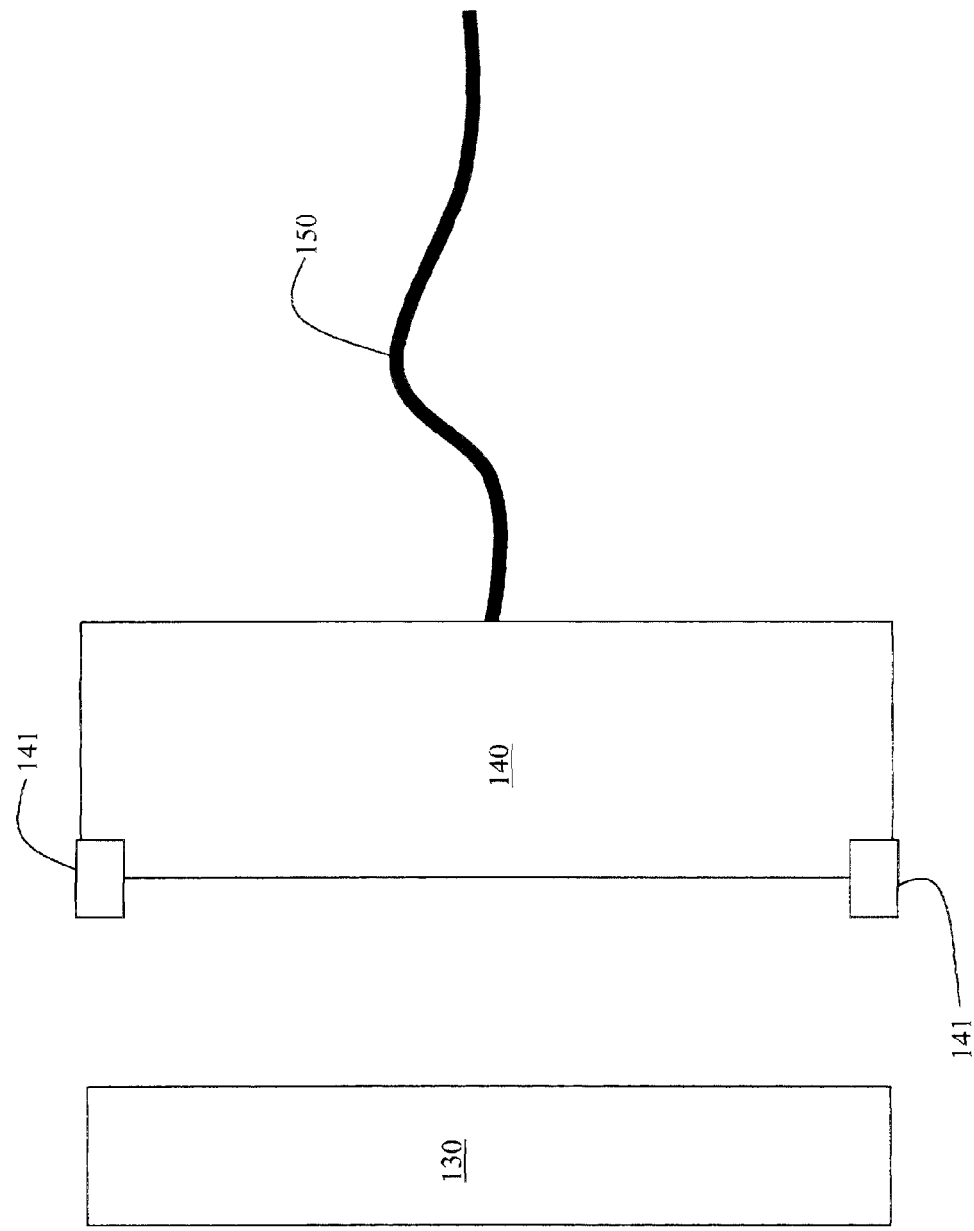
FIG. 4 illustrates a schematic diagram of an exemplary embodiment of a side view of a first image capturing sensor having an integral attachment mechanism and being in proximity to but unattached from an exemplary embodiment of a second image capturing sensor.

FIG. 4 illustrates a schematic diagram of an exemplary embodiment of a side view of a first image capturing sensor 140 having an integral attachment mechanism 141 and being in proximity to but unattached from an exemplary embodiment of a second image capturing sensor 130. In accordance with an embodiment, the first image capturing source 140, having the integral attachment mechanism 141, and the second image capturing source 130 constitute a kit. As used herein, the term "kit" refers to a plurality of items that may be packaged and/or sold together for commercial purposes.

Figure 5B:
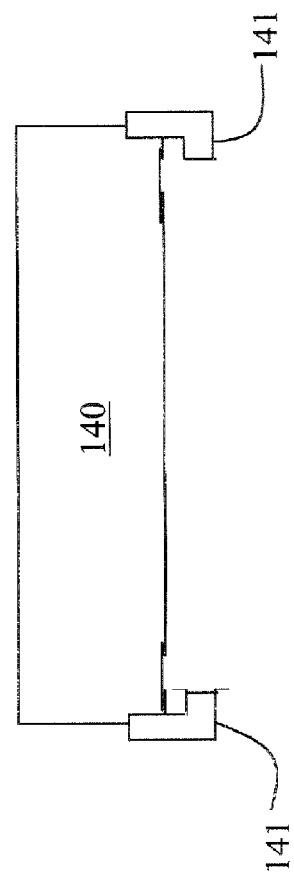
FIG. 5B illustrates a schematic diagram of a top view of the first image capturing sensor of FIG. 4 having an integral attachment mechanism.
Figure 5A:
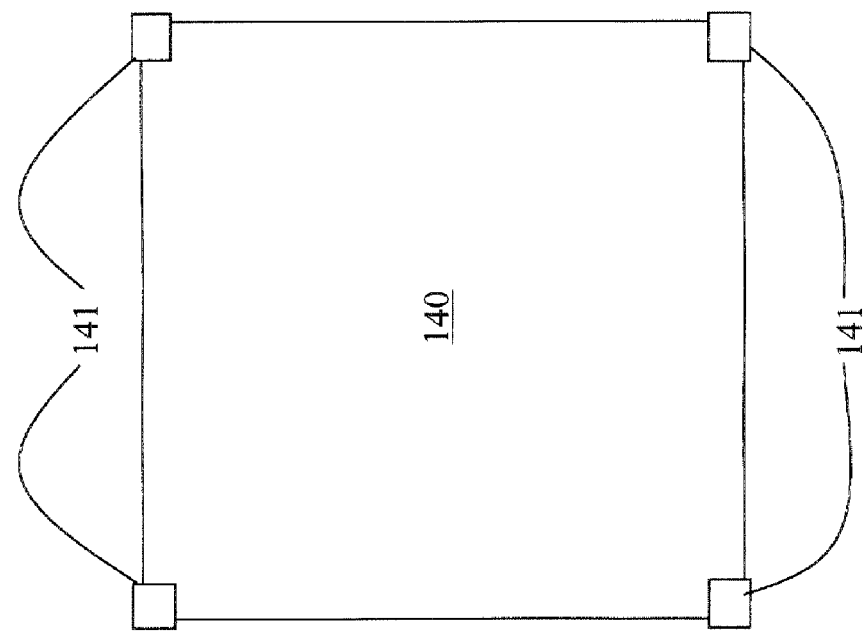
FIG. 5A illustrates a schematic diagram of a front view of the first image capturing sensor of FIG. 4 having an integral attachment mechanism.

In accordance with the embodiment of FIG. 4, the first image capturing source 140 is a corded sensor having a cord 150. The integral attachment mechanism 141 may comprise a set of four clips on the corners of the first image capturing source 140 that are capable of clipping onto the outer surface of the second image capturing source 130 at the corners of the second image capturing source 130 to provide a snug and aligned fit of the two image capturing sources 130 and 140. FIG. 5A illustrates a schematic diagram of a front view of the first image capturing sensor 140 of FIG. 4 having the integral attachment mechanism 141, and FIG. 5B illustrates a schematic diagram of a top view of the first image capturing sensor 140 of FIG. 4 having the integral attachment mechanism 141.

Alternatively, the integral attachment mechanism may comprise a set of four slots on the corners of the first image capturing source 140 such that the second image capturing source 130 is capable of sliding onto and through the slots to be held in place in an aligned and snug manner with respect to the first image capturing source 140. Other forms of attachment mechanisms are possible as well which may be integral to the first image capturing source 140.

Similarly, FIG. 6 illustrates a schematic diagram of an exemplary embodiment of a side view of a first image capturing source 140 being in proximity to but unattached from an exemplary embodiment of a second image capturing source 130 having an integral attachment mechanism 131. In accordance with an embodiment, the first image capturing source 140 and the second image capturing source 130, having an integral attachment mechanism 131, constitute a kit. In accordance with the embodiment of FIG. 6, the first image capturing source 140 is a corded sensor having a cord 150. The integral attachment mechanism 131 may comprise a set of four clips on the corners of the second image capturing source 130 that are capable of clipping onto the outer surface of the first image capturing source 140 at the corners of the first image capturing source 140 to provide a snug and aligned fit of the two image capturing sources 130 and 140. FIG. 7A illustrates a schematic diagram of a front view of the second image capturing sensor 130 of FIG. 6 having the integral attachment mechanism 131, and FIG. 5B illustrates a schematic diagram of a top view of the second image capturing sensor 130 of FIG. 6 having the integral attachment mechanism 131.

Alternatively, the integral attachment mechanism may comprise a set of four slots on the corners of the second image capturing source 130 such that the first image capturing source 140 is capable of sliding onto and through the slots to be held in place in an aligned and snug manner with respect to the second image capturing source 130. Other forms of attachment mechanisms are possible as well which may be integral to the second image capturing source 130.

FIG. 8 illustrates a schematic diagram of a side view of an exemplary embodiment of a first image capturing source 140, a second image capturing source 130, and a separate and distinct attachment mechanism 161 all in proximity to each other but not attached to each other. In this embodiment, the attachment mechanism 161 is not integral to either the first image capturing source 140 or the second image capturing source 130. In accordance with the embodiment, the first image capturing source 140, the second image capturing source 130, and the attachment mechanism 161 constitute a kit. The attachment mechanism 161 may comprise a substantially rectangularly shaped interface having four attachment clips on its corners, on both sides of the attachment mechanism 161, as shown in FIG. 9A and FIG. 9B. The attachment clips are capable of clipping onto the outer surface of the first image capturing source 140 and the second image capturing source 130 at their respective front and back corners to provide a snug and aligned fit of the two image capturing sources 130 and 140. FIG. 9A illustrates a schematic diagram of a front view of the attachment mechanism 161 of FIG. 8, and FIG. 9B illustrates a schematic diagram of a top view of the attachment mechanism 161 of FIG. 8.

Alternatively, the attachment mechanism may comprise a set of four slots on its corners, on both sides of the attachment mechanism, such that the first image capturing source 140 is capable of sliding onto and through the slots on one side of the attachment mechanism, and the second image capturing source 130 is capable of sliding onto and through the slots on the other side of the attachment mechanism to hold the image capturing sensors 130 and 140 in place in an aligned and snug manner with respect to each other. Other forms of attachment mechanisms 161 are possible as well which may be separate and distinct from the first and second image capturing sources 140 and 130.

Figure 10:
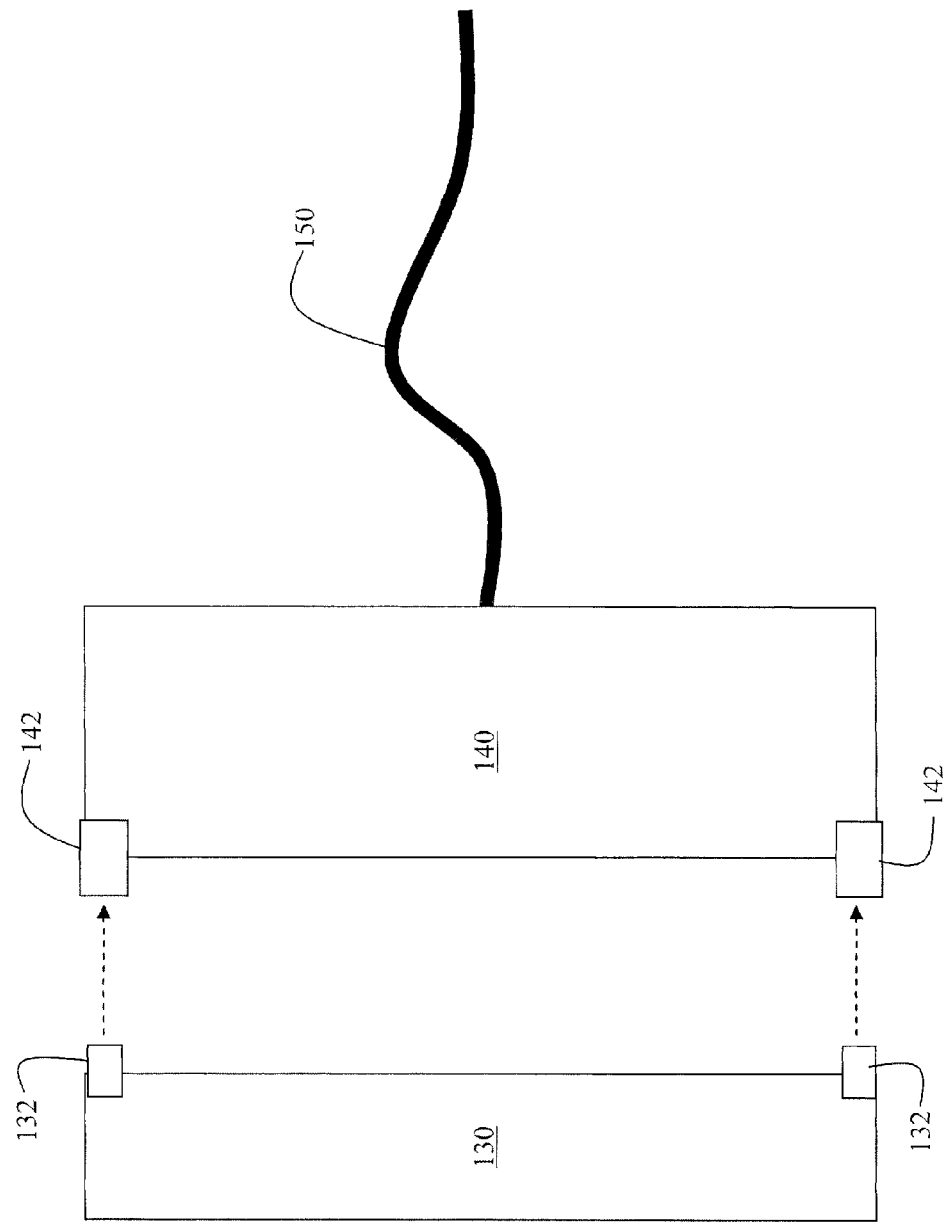
FIG. 10 illustrates a schematic diagram of an exemplary embodiment of a side view of a first image capturing sensor having an integral attachment mechanism and being in proximity to but unattached from an exemplary embodiment of a second image capturing sensor having a complementary integral attachment mechanism.

FIG. 10 illustrates a schematic diagram of an exemplary embodiment of a side view of a first image capturing sensor 140 having an integral attachment mechanism 142 and being in proximity to but unattached from an exemplary embodiment of a second image capturing sensor 130 having a complementary integral attachment mechanism 132. In this embodiment, the attachment mechanism 142 is integral to the first image capturing source 140, and the attachment mechanism 132 is integral to the second image capturing source 130. In accordance with the embodiment, the first image capturing source 140 having the attachment mechanism 142 and the second image capturing source 130 having the attachment mechanism 132 constitute a kit. The attachment mechanism 142 may comprise a set of female acceptors and the attachment mechanism 132 may comprise a complementary set of male pins that snap into the female acceptors to hold the image capturing sensors 130 and 140 in place in an aligned and snug manner with respect to each other. Other forms of attachment mechanisms 142 and 132 are possible as well which may be integral to the first and second image capturing sources 140 and 130 respectively and which complementarily mate with each other.

In summary, kits for acquiring redundant images are disclosed. A kit may include a first imaging source and a second imaging source. The kit may further include an attachment mechanism for attaching the first imaging source to the second imaging source such that first imaging source and the second imaging source may be simultaneously exposed to capture a first primary image and a second backup image, respectively, of a same anatomy. The kit may further include a sterilization sheath to cover both the first imaging source and the second imaging source when the first imaging source and the second imaging source are attached and being used to capture images.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A kit for acquiring redundant images, said kit comprising:
   means for acquiring a first primary image in response to an exposure;
   means for acquiring a second backup image in response to said exposure;
   means for attaching said means for acquiring a second backup image to said means for acquiring a first primary image; and
   means for keeping said means for acquiring a first primary image and said means for acquiring a second backup image sterile when said means for acquiring a second backup image and said means for acquiring a first primary image are attached via said means for attaching.

2. The kit of claim 1 wherein said means for attaching is an integral part of said means for acquiring a first primary image.

3. The kit of claim 1 wherein said means for attaching is an integral part of said means for acquiring a second backup image.

4. The kit of claim 1 wherein a first portion of said means for attaching is an integral part of said means for acquiring a first primary image and a second portion of said means for attaching is an integral part of said means for acquiring a second backup image.

5. The kit of claim 1 wherein said means for attaching is separate and distinct from said means for acquiring a first primary image and said means for acquiring a second backup image.

6. A kit for acquiring redundant images, said kit comprising:
   a first image capturing source;
   a second image capturing source capable of being attached to said first image capturing source such that said first image capturing source and said second image capturing source may be simultaneously exposed to capture a first primary image and a second backup image, respectively, of a same anatomy; and
   a sterilization sheath capable of protecting said first image capturing source and said second image capturing source when said first image capturing source and said second image capturing source are attached.

7. The kit of claim 6 wherein said first image capturing source comprises a digital charge-coupled-device (CCD) sensor and said second image capturing source comprises a phosphor plate.

8. The kit of claim 6 wherein said first image capturing source comprises a digital CCD sensor and said second image capturing source comprises a film.

9. The kit of claim 6 wherein said first image capturing source comprises a digital phosphor plate and said second image capturing source comprises a film.

10. The kit of claim 6 further comprising means for attaching said first image capturing source and said second image capturing source.

11. The kit of claim 10 wherein said means for attaching is an integral part of said first image capturing source.

12. The kit of claim 10 wherein said means for attaching is an integral part of said second image capturing source.

13. The kit of claim 10 wherein a first portion of said means for attaching is an integral part of said first image capturing source and a second portion of said means for attaching is an integral part of said second image capturing source.

14. The kit of claim 10 wherein said means for attaching is separate and distinct from said first image capturing source and said second image capturing source.

15. A kit for acquiring redundant images, said kit comprising:
   a first image capturing source; and
   a second image capturing source capable of being attached to said first image capturing source such that said first image capturing source and said second image capturing source may be simultaneously exposed to capture a first primary image and a second backup image, respectively, of a same anatomy.

16. The kit of claim 15 wherein said first image capturing source comprises a digital CCD sensor and said second image capturing source comprises a phosphor plate.

17. The kit of claim 15 wherein said first image capturing source comprises a digital CCD sensor and said second image capturing source comprises a film.

18. The kit of claim 15 wherein said first image capturing source comprises a phosphor plate and said second image capturing source comprises a film.

19. A kit for acquiring redundant images, said kit comprising:
   a first image capturing source capable of being attached to a second image capturing source such that said first image capturing source and said second image capturing source may be simultaneously exposed to capture a first primary image and a second backup image, respectively, of a same anatomy; and
   a sterilization sheath capable of protecting said first image capturing source and said second image capturing source when said first image capturing source and said second image capturing source are attached.

20. The kit of claim 19 wherein said first image capturing source comprises a digital CCD sensor.

21. The kit of claim 19 wherein said first image capturing source comprises a phosphor plate.

22. The kit of claim 19 wherein said first image capturing source comprises a film.

23. A kit for acquiring redundant images, said kit comprising:
   a first image capturing source; and
   means for attaching said first image capturing source to a second image capturing source such that said first image capturing source and said second image capturing source may be simultaneously exposed to capture a first primary image and a second backup image, respectively, of a same anatomy.

24. The kit of claim 23 wherein said first image capturing source comprises a digital intra-oral sensor.

25. The kit of claim 23 wherein said first image capturing source comprises a film.

* * * * *